Dec. 27, 1955    R. F. MOUTON    2,728,673
METHOD OF MAKING BEVERAGE CONCENTRATE
Filed Dec. 12, 1951
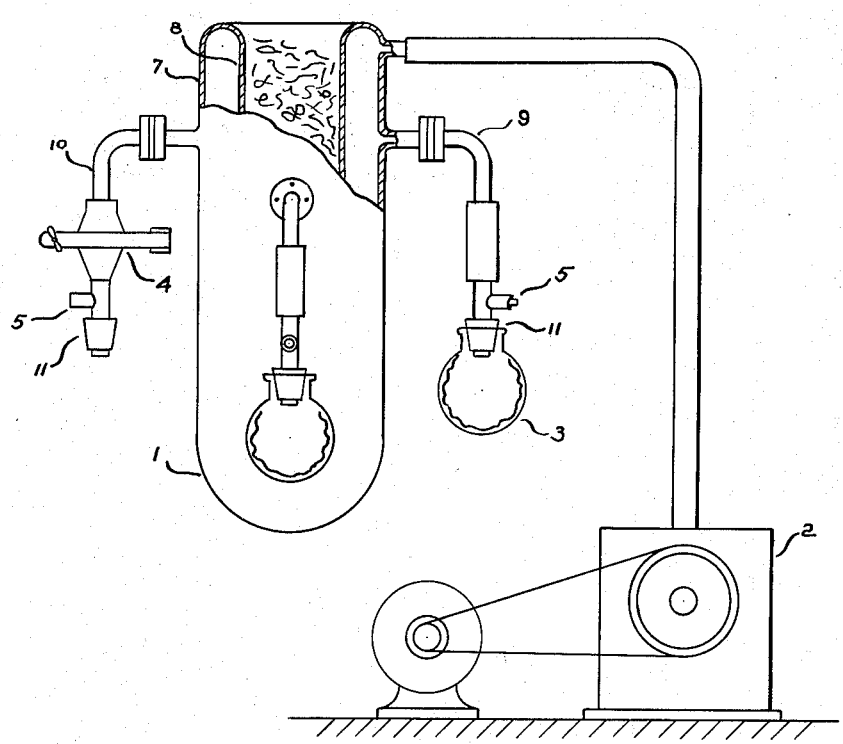
ROBERT F. MOUTON
INVENTOR
BY Arthur G Connolly
HIS ATTORNEY

United States Patent Office 2,728,673
Patented Dec. 27, 1955

2,728,673

METHOD OF MAKING BEVERAGE CONCENTRATE

Robert F. Mouton, Tervueren-Brussels, Belgium

Application December 12, 1951, Serial No. 261,339

2 Claims. (Cl. 99—78)

The present invention relates to fermented beverage concentrates, and to methods of making same.

For a great many years those skilled in the art have attempted to obtain concentrates of fermented beverages which retain all of the delicate aromas and taste present in the original beverage. None of these attempts has been completely successful, because of the extreme sensitivity of these beverages to the temperatures and/or other conditions necessary in order to carry out the concentration processes employed. The delicate aromas of these beverages are exceedingly volatile, and, hence, are lost at the temperatures required for these processes. Invariably, the prior art methods of concentrating fermented beverages, such as beer, have caused deterioration of either the body or aroma of these beverages, or both.

It is an object of the present invention to overcome these defects of the prior art. A further object of the invention is to produce a beer concentrate which retains the delicate flavor and aroma of the original beverage. A still further object of the invention is to produce a beer concentrate which may be easily reconstituted to form a beverage having the same taste, aroma and qualities as the original beverage. These and other objects will be apparent from this specification, including the appended claims.

The above objects are attained by virtue of the discovery that fermented beverages, such as beer, ale, liquors and the like which are derived from cereals, may be satisfactorily concentrated by the process of lyophilation or "freeze-drying." The powders which are thus produced may be stored for extended periods without deterioration, may be used with any number of ingredients as flavoring agents, or may be reconstituted into the original beverage by the addition of appropriate amounts of water, ethanol and carbon dioxide.

The above discovery represents an extreme departure from the prior art, since fermented beverages derived from fruit, such as cider, wine and the like, cannot be satisfactorily dried by the process of lyophilation because of their tendency to be reduced to a paste with the consistency of caramel during the actual water-removing step.

While I am not fully aware of the mechanism involved in the process used, it appears to me that the unexpected success I have had in freeze-drying various fermented beverages derived from cereals is largely due to the nature of the carbohydrates present within these beverages.

The various malt sugars and carbohydrates in these beverages evidently are incapable of holding water in the manner in which it is held merely with pectins or/and glycerol, I figure, in cider, wine, fruit juice and the like, when these food items are concentrated by lyophilation. The small proportion of alcohol present in the beverages employed appears to lower the surface tension of the ice formed during the process, and thus to aid in the sublimation of water, providing a good elimination of the non-condensed EtOH vapors by the pump. As initially unexpected, the $CO_2$ present in these beverages must not be necessarily removed prior to freeze-drying. In our experimental conditions, direct lyophilation was satisfactorily achieved, the initial raise of non-condensable vapor pressure being so quickly reduced to the normal 75 microns pressure that no melting of the pre-frozen beer has time to occur.

In order to further describe the invention, reference is made to the accompanying drawing, showing schematically the equipment used in accordance with this invention, to freeze-dry fermented beer-like beverages.

As is seen from the drawing, the apparatus employed is composed of a condenser 1, which is preferably of the Dewar flask type of construction having an attached pump 2 which serves to create a vacuum between the side walls 7 and 8. Preferably the pump is of the two-stage vane variety of 5 cubic meters per hour capacity, and is capable of maintaining a pressure of the order of 50 to 200 microns of mercury throughout the lyophilation operation. Preferably, the pump may be equipped for intermittent purification of the oil employed. It is to be understood that the invention is not limited to this specific pump, since others capable of the equivalent functioning may be employed.

Also attached to the side wall 7 of the condenser 1 is a series of pipes 9 and 10 leading to vacuum closures 4 and flask connections 11. Air vents 5 are positioned between the vacuum closures and the flask connections. As shown in the drawing, flasks, preferably of the round bottom 2-liter type, are attached at 11 during the process, as will be further described.

In carrying out the process these flasks are filled with approximately ⅓ of a liter of beer, or other fermented beverage. The filled flasks are then rotated rapidly while being dipped in a freezing mixture at approximately minus 78° C. Such mixtures are well-known in the art, and commonly comprise solid carbon dioxide mixed with an organic solvent such as acetone, isopropyl alcohol, or ethyl alcohol. Temperatures higher than minus 50° C. do not freeze the beer rapidly enough to completely obtain the advantages of the process.

After the flask has been treated in this manner a thin layer of frozen beverage covers the inside of the container. This layer is then "dried" by a vacuum created by the pump 2 as soon as the flask is placed, at 11, as shown in the drawing. The water withdrawn by sublimation from the ice layer is condensed within the walls of the Dewar type condenser, from which it is removed at appropriate intervals. The non-condensed $CO_2$ and EtOH withdrawn are eliminated from the vacuum system by the pump and can be recovered separately. The flask should be subjected to this vacuum for a period of from about 4 hours to about 20 hours, depending upon the thickness of the ice layer and the material being treated. The sublimation of the water and alcohol acts to keep the entire contents of the flask in a freezing state, in spite of the fact that the sides of the flasks themselves are exposed to room temperature. When only a dry powder or layer remains within the flask employed, the valve 4 is closed and the vent 5 is opened so that the flask can be conveniently detached. The residue in the flask can then be easily removed by mechanical means, as with a spatula, in the form of a powder.

In the required specific example of the process of this invention a 2-liter flask is filled with ⅓ liter of a light Pilsen type beer and is frozen at minus 78° C. in a solid carbon dioxide-isopropyl alcohol mixture, as indicated above; this flask is "dried" for about 14 hours under a pressure of 15 microns of mercury, also as indicated above. At the end of this time the valve 4 is closed and air is admitted to the flask by means of the vent 5 so that the flask may be readily removed. The friable crust remaining within the flask is readily broken up and removed as a powder with a spatula. The total extract obtained from the indicated quantity of beer weighs about 13 grams, representing approximately a 25-fold reduction in weight. When the reduction in weight over the original bottle is considered, the present process gives approximately a 50-fold reduction weight. This concentrate was readily re-constituted into the original beer by the addition of distilled water, ethanol and carbon dioxide in the proportionate quantities in which they were present in the original product.

The quantity of powder obtained in this process will vary, depending upon the type of beer, ale, liquor or other fermented alcoholic beverage employed. The concentrates of the invention may be used as flavoring agents during cooking, baking, manufacturing confections and the like. In addition, they may be readily compressed into pills, which can be taken for their high vitamin and high protein content, without being reconstituted into the original alcoholic beverage. Also, the concentrates of this invention may be formed into new beverages, f. i. into non-alcoholic beverages by merely adding distilled water, or high-alcoholic beverages by merely adding alcohol.

It is to be understood that the invention herein described is not limited by any of the specific examples or modifications set forth, and is to be limited only on scope of the appended claims. Various modifications such as the use of other "freeze-drying" apparatus than the specific apparatus indicated can be made by those skilled in the art.

I claim:

1. A process for producing a dry concentrate of a fermented alcoholic cereal beverage which comprises freezing said fermented alcoholic cereal beverage at a temperature of at least about minus 50° C., then subjecting the frozen mixture to a vacuum of the order of 50 to 200 microns mercury while maintaining the mixture in the frozen state until lyophilization is completed and substantially all of the water, alcohol and carbon dioxide is removed.

2. The method of claim 1 wherein the fermented alcoholic cereal beverage is beer.

References Cited in the file of this patent

UNITED STATES PATENTS

| | | |
|---|---|---|
| 30,147 | Luedke | Sept. 25, 1860 |
| 78,874 | Hawks | June 16, 1868 |
| 169,818 | Lockwood | Nov. 9, 1875 |
| 1,228,917 | Heuser | June 5, 1917 |
| 2,199,816 | Flosdorf | May 7, 1940 |

OTHER REFERENCES

Article "Sublimation Method of Dehydration," published in Food Manufacture, March 1944, vol. XIX, No. 3, page 77.

Article "Drying by Sublimation," by Earl W. Flosdorf, published in Food Industries, January 1945, pages 92 to 95, 168, 170, 172, 174, 176 and 178.

Article "Vacuum Freeze Drying," by H. H. Chambers Manufacturing Chemist and Man. Perfumer, February 1949, XX, 2; pages 75, 76, 77.